(12) United States Patent
Nakamura et al.

(10) Patent No.: US 11,571,957 B2
(45) Date of Patent: Feb. 7, 2023

(54) ELECTRIC VEHICLE

(71) Applicants: TOYOTA JIDOSHA KABUSHIKI KAISHA, Aichi (JP); SUBARU CORPORATION, Tokyo (JP)

(72) Inventors: Kentaro Nakamura, Toyota (JP); Osamu Shimasaki, Nisshin (JP); Ryosuke Negawa, Tokyo-to (JP)

(73) Assignees: TOYOTA JIDOSHA KABUSHIKI KAISHA, Aichi-Ken (JP); SUBARU CORPORATION, Tokyo (JP)

( * ) Notice: Subject to any disclaimer, the term of this patent is extended or adjusted under 35 U.S.C. 154(b) by 267 days.

(21) Appl. No.: 17/030,378

(22) Filed: Sep. 24, 2020

(65) Prior Publication Data

US 2021/0122221 A1    Apr. 29, 2021

(30) Foreign Application Priority Data

Oct. 24, 2019 (JP) .............................. JP2019-193507

(51) Int. Cl.
*B60K 1/04* (2019.01)
*B60R 16/02* (2006.01)

(52) U.S. Cl.
CPC ............ *B60K 1/04* (2013.01); *B60R 16/0215* (2013.01)

(58) Field of Classification Search
CPC .............. B60K 1/04; B60K 2001/0411; B60R 16/0215; B60R 16/0239; B60R 16/03; B60R 16/033; B60R 16/04
See application file for complete search history.

(56) References Cited

U.S. PATENT DOCUMENTS

| | | | | |
|---|---|---|---|---|
| 6,994,178 B2* | 2/2006 | Mizuno | ..................... | B60K 1/04 180/312 |
| 7,726,429 B2* | 6/2010 | Suzuki | ................. | B62D 21/152 180/232 |
| 8,413,751 B2* | 4/2013 | Jufuku | .................. | H01M 8/247 180/68.5 |
| 9,079,508 B2* | 7/2015 | Naito | ....................... | B60L 1/003 |
| 9,873,456 B2* | 1/2018 | Hara | ......................... | B60K 1/04 |
| 9,987,912 B2* | 6/2018 | Shinoda | .................... | B60K 1/04 |
| 10,232,883 B2* | 3/2019 | Sakamoto | ............... | B60L 50/51 |
| 11,148,532 B2* | 10/2021 | Peirone | ................. | B60L 3/0007 |

(Continued)

FOREIGN PATENT DOCUMENTS

| | | |
|---|---|---|
| CN | 103189224 A | 7/2013 |
| JP | 201120628 A | 2/2011 |

(Continued)

*Primary Examiner* — Jeffrey J Restifo
(74) *Attorney, Agent, or Firm* — Hauptman Ham, LLP

(57) ABSTRACT

An electric vehicle may include: a body comprising a compartment on a front side of a cabin; a component frame located in the compartment, and connected to the body; and a circuit case located on the component frame, comprising therein a control circuit configured to control a traction motor, and constituted of metal. The component frame may comprise: a plurality of crossmembers extending along a vehicle left-right direction; and a connection member connecting the plurality of crossmembers to each other. The plurality of crossmembers may comprise a rear crossmember which is a rearmost crossmember of the plurality of crossmembers. The circuit case may be on the front side of a rear end of the rear crossmember in a top view.

2 Claims, 6 Drawing Sheets

(56) References Cited

U.S. PATENT DOCUMENTS

| | | | |
|---|---|---|---|
| 11,305,628 B2* | 4/2022 | Tanaka | B60K 1/04 |
| 2004/0090085 A1* | 5/2004 | Kawasaki | B60L 50/66 |
| | | | 296/187.09 |
| 2004/0235315 A1* | 11/2004 | Masui | B60L 50/66 |
| | | | 439/34 |
| 2013/0220718 A1* | 8/2013 | Gotou | B62D 21/11 |
| | | | 180/65.6 |
| 2014/0151138 A1* | 6/2014 | Kitami | H02H 5/00 |
| | | | 307/328 |
| 2015/0021114 A1* | 1/2015 | Hotta | B60R 16/04 |
| | | | 180/274 |
| 2016/0207386 A1* | 7/2016 | Nagaosa | B60K 1/04 |
| 2016/0368358 A1* | 12/2016 | Nagaosa | B60L 58/30 |
| 2017/0197569 A1* | 7/2017 | Kabayama | H01M 50/249 |
| 2019/0113011 A1* | 4/2019 | Hirano | F02M 35/048 |
| 2019/0126983 A1 | 5/2019 | Okura et al. | |
| 2019/0126989 A1 | 5/2019 | Okura | |
| 2020/0076270 A1* | 3/2020 | Murai | B62D 27/02 |
| 2020/0269785 A1* | 8/2020 | Salter | B62D 25/081 |
| 2020/0331532 A1* | 10/2020 | Volz | B60K 1/04 |
| 2020/0338975 A1* | 10/2020 | Tanaka | B60K 1/04 |
| 2021/0053623 A1* | 2/2021 | Shimokouchi | B60R 16/0215 |
| 2021/0122221 A1* | 4/2021 | Nakamura | B60K 1/04 |
| 2021/0237801 A1* | 8/2021 | Atsumi | B62D 27/02 |
| 2021/0284031 A1* | 9/2021 | Yamada | H01M 10/425 |
| 2022/0041042 A1* | 2/2022 | Drabon | B60L 50/60 |
| 2022/0097767 A1* | 3/2022 | Jeong | B62D 25/082 |
| 2022/0118927 A1* | 4/2022 | Hara | B60K 1/04 |
| 2022/0161646 A1* | 5/2022 | Abushawashi | B62D 21/03 |

FOREIGN PATENT DOCUMENTS

| | | |
|---|---|---|
| JP | 2013103584 A | 5/2013 |
| JP | 2013219862 A | 10/2013 |
| JP | 201985088 A | 6/2019 |
| JP | 202026219 A | 2/2020 |
| JP | 202032813 A | 3/2020 |

* cited by examiner

ELECTRIC VEHICLE

CROSS-REFERENCE TO RELATED APPLICATION

This application claims priority to Japanese Patent Application No. 2019-193507 filed on Oct. 24, 2019, the contents of which are hereby incorporated by reference into the present application.

TECHNICAL FIELD

The art disclosed herein relates to an electric vehicle.

BACKGROUND

An electric vehicle described in Japanese Patent Application Publication No. 2011-020628 has a compartment (motor room) on a front side of a cabin. In the compartment, a traction motor and a control circuit configured to control the traction motor (such as inverter and DC/DC converter) are disposed. Further, in the compartment, a component frame is provided. The control circuit is arranged on the component frame.

SUMMARY

In an electric vehicle having a control circuit in a compartment as in Japanese Patent Application Publication No. 2011-020628, the control circuit is susceptible to being damaged when the electric vehicle collides at its front. If the control circuit is damaged, an electrical control of the vehicle becomes difficult. The present disclosure proposes an art configured to suppress damage of a control circuit arranged in a compartment upon collision.

An electric vehicle disclosed herein, comprising: a body comprising a compartment on a front side of a cabin; a component frame located in the compartment, and connected to the body; and a circuit case located on the component frame, comprising therein a control circuit configured to control a traction motor, and constituted of metal. The component frame comprises: a plurality of crossmembers extending along a vehicle left-right direction; and a connection member connecting the plurality of crossmembers to each other. The plurality of crossmembers comprises a rear crossmember which is a rearmost crossmember of the plurality of crossmembers. The circuit case is on the front side of a rear end of the rear crossmember in a top view.

When the electric vehicle collides at its front, the circuit case is pushed rearward together with the component frame by deformation of the body. At this occasion, the control circuit within the circuit case is damaged if the circuit case collides with constituent member(s) of the body disposed on the rear side of the circuit case, and large load is applied on the circuit case. However, in the aforementioned electric vehicle, the circuit case is disposed on the front side of the rear end of the rear crossmember in the top view. Due to this, the rear crossmember is likely to collide with the body constituent member(s) before the circuit case collides with the body constituent member(s). As such, the load applied on the circuit case is reduced. Due to this, the damage to the control circuit within the circuit case can be suppressed.

DETAILED DESCRIPTION

Embodiment

Figure 1:
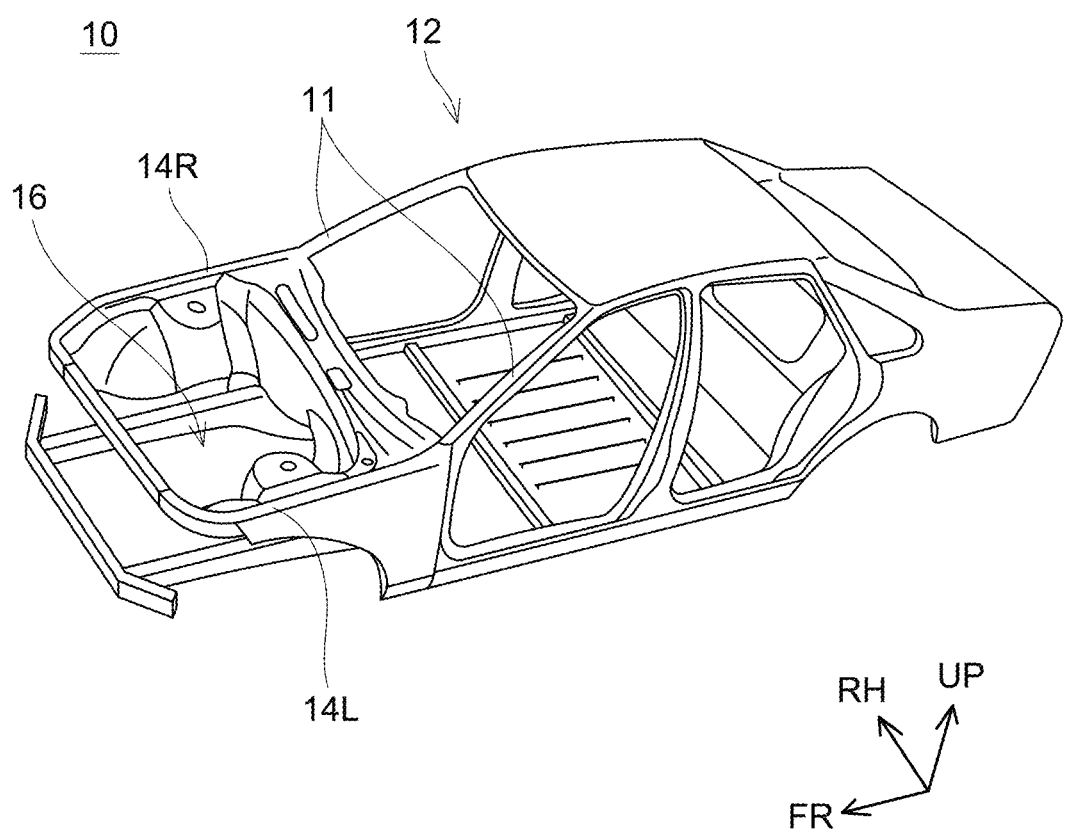
FIG. 1 illustrates a perspective view of a body.

An electric vehicle according to an embodiment incorporates a traction motor. The electric vehicle is configured to run by driving wheels with the traction motor. FIG. 1 shows a body 10 of the electric vehicle according to the embodiment. In each of respective figures including FIG. 1, an arrow FR indicates a vehicle front direction, an arrow RH indicates a vehicle right direction, and an arrow UP indicates a vehicle upward direction. The body 10 comprises front pillars 11 and apron upper members 14 (i.e. right apron upper member 14R and left apron upper member 14L) extending frontward from the front pillars 11. The body 10 comprises a compartment 16 in a range surrounded by the two apron upper members 14. The compartment 16 is arranged on a front side of the cabin 12.

Figure 2:
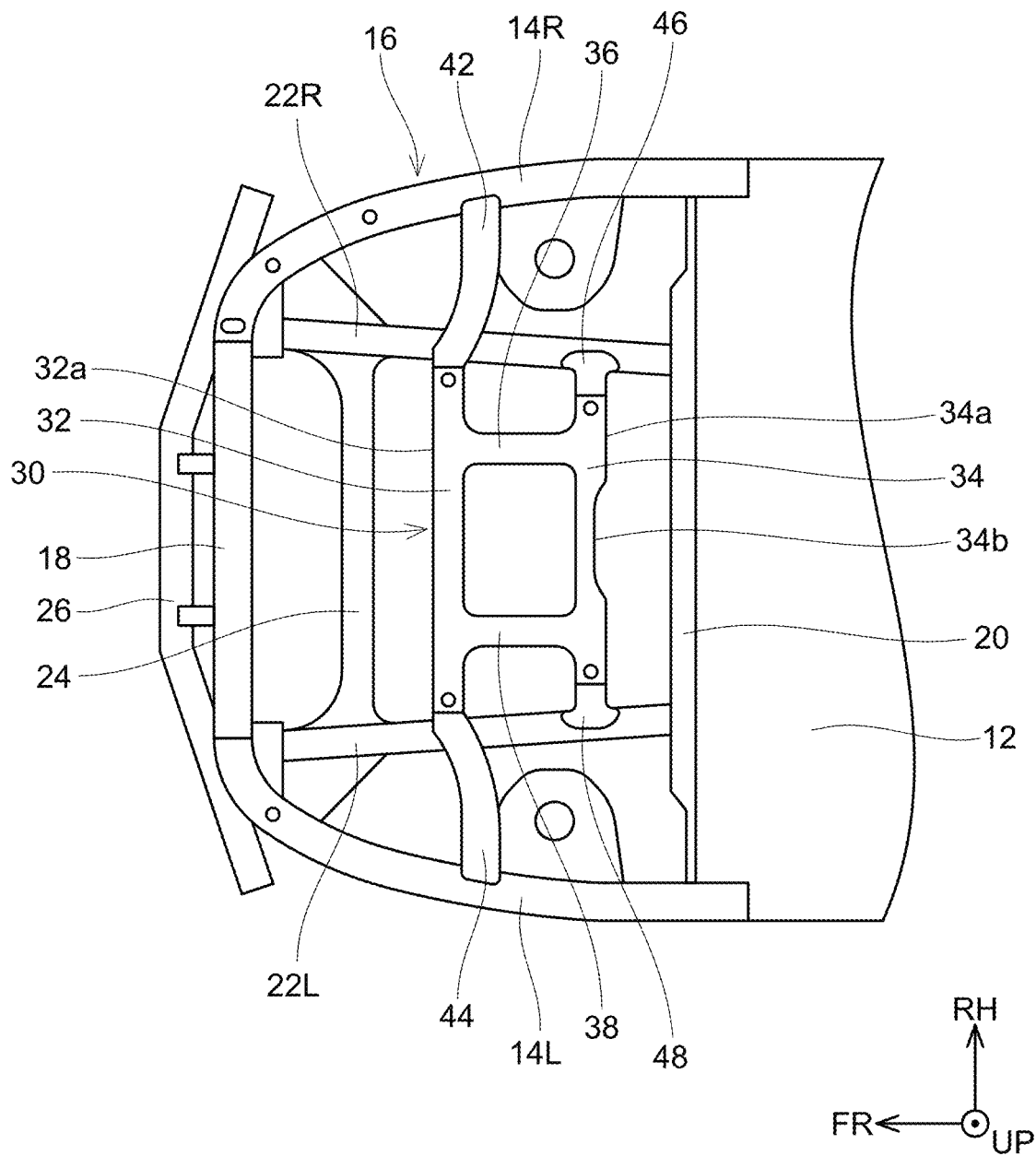
FIG. 2 illustrates a plan view of a compartment (with a circuit case omitted).
Figure 3:
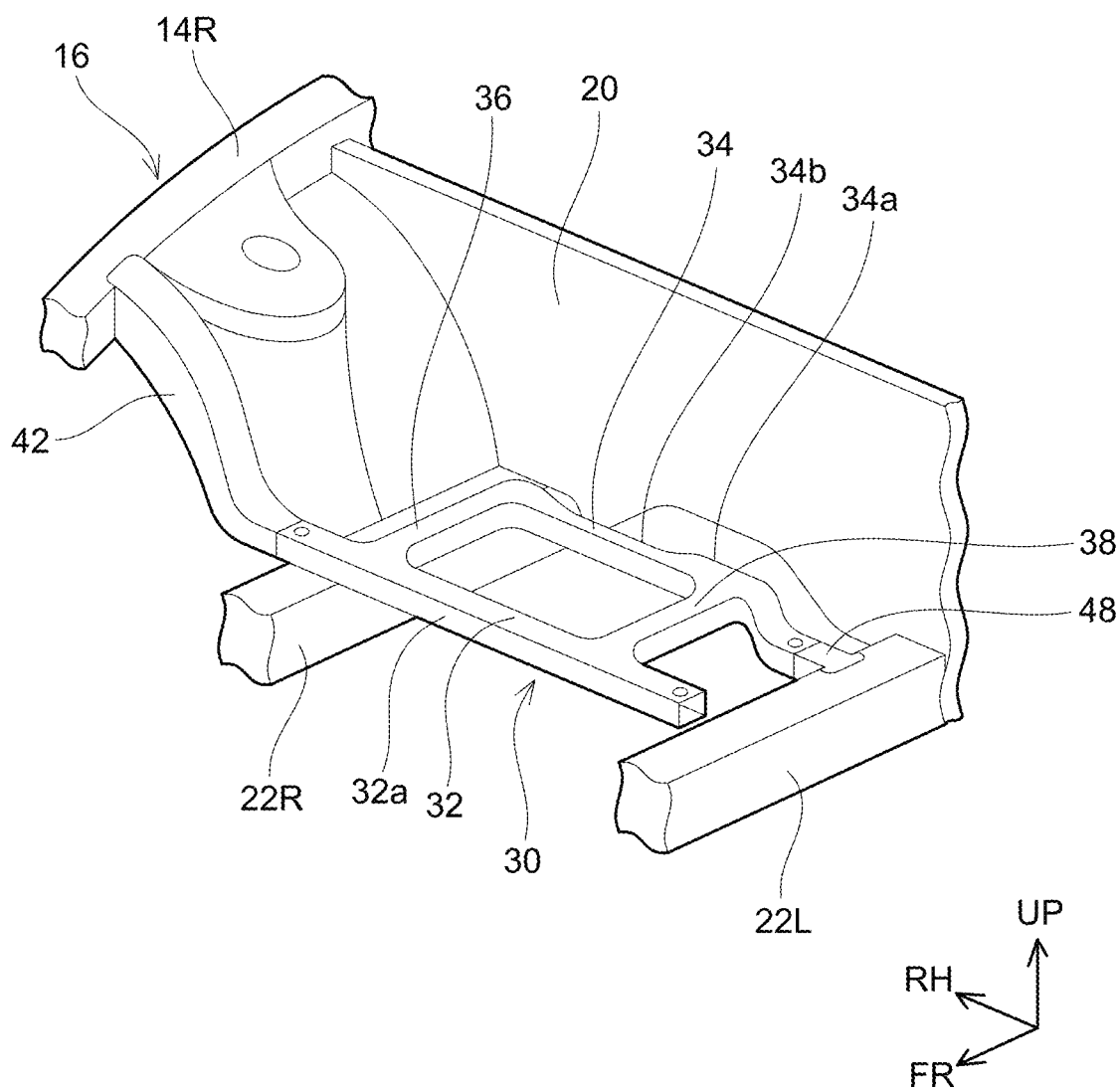
FIG. 3 illustrates a perspective view of the compartment (with the circuit case omitted).

FIGS. 2 and 3 show an inside of the compartment 16. A dash panel 20 is arranged on a rearmost part of the compartment 16. The dash panel 20 separates the compartment 16 and a cabin 12 from each other. The right apron upper member 14R and the left apron upper member 14L extend along opposing edges on left and right sides of the compartment 16. The right apron upper member 14R and the left apron upper member 14L are connected to each other by a core support 18 on a frontmost part of the body 10. The core support 18 constitutes a front end of the compartment 16.

A pair of front side members 22 (right front side member 22R and left front side member 22L) is arranged inside the compartment 16. Each front side member 22 extends along the front-rear direction. The front side members 22 are arranged on a lower side of the apron upper members 14. The right front side member 22R and the left front side member 22L are connected to each other by a front crossmember 24 inside the compartment 16. Further, the right front side member 22R and the left front side member 22L are connected to a bumper reinforcement 26 at the frontmost part of the body 10.

A component frame 30 for mounting components is arranged inside the compartment 16. The component frame 30 is fixed to the body 10 inside the compartment 16. The component frame 30 comprises a front crossmember 32, a rear crossmember 34, a right connecting member 36, and a left connecting member 38.

The front crossmember 32 extends long along a left-right direction. A right end of the front crossmember 32 is connected to a bracket 42. The bracket 42 extends diagonally upward, and is connected to the right apron upper member 14R. That is, the right end of the front crossmember 32 is connected to the right apron upper member 14R via the bracket 42. A left end of the front crossmember 32 is connected to a bracket 44. The bracket 44 extends diagonally upward, and is connected to the left apron upper member 14L. That is, the left end of the front crossmember 32 is connected to the left apron upper member 14L via the bracket 44.

The rear crossmember 34 extends long along the left-right direction. The rear crossmember 34 is arranged on a rear side of the front crossmember 32. A recess 34b is arranged on a rear side surface 34a (side surface facing the dash panel 20) of the rear crossmember 34. A right end of the rear crossmember 34 is connected to the right front side member 22R via a bracket 46. A left end of the rear crossmember 34 is connected to the left front side member 22L via a bracket 48.

The right connecting member 36 extends long along the front-rear direction. The right connecting member 36 connects the front crossmember 32 and the rear crossmember 34 to each other. The left connecting member 38 extends long along the front-rear direction. The left connecting member 38 connects the front crossmember 32 and the rear crossmember 34 to each other.

Figure 4:
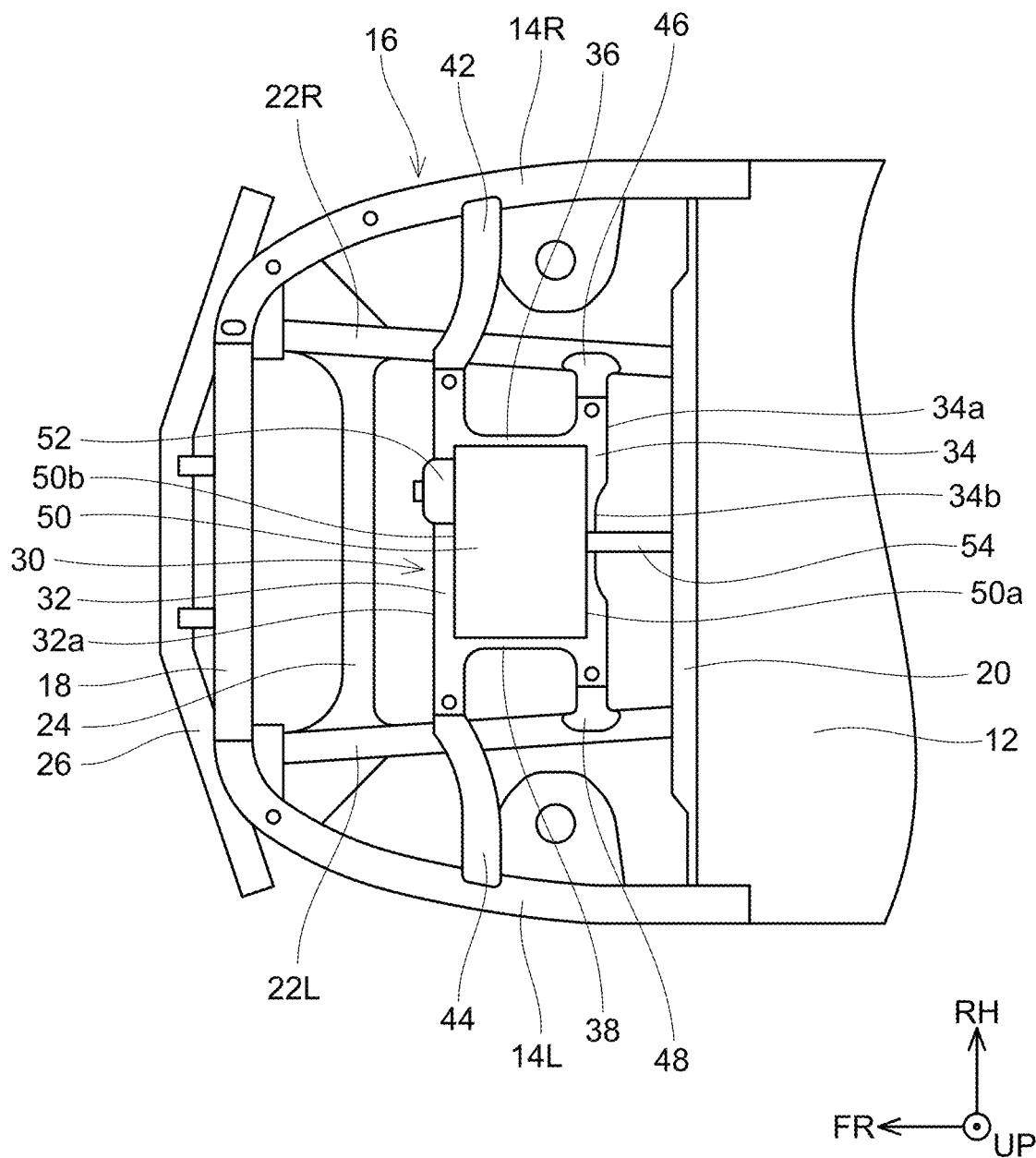
FIG. 4 illustrates a plan view of the compartment (including the circuit case).
Figure 5:
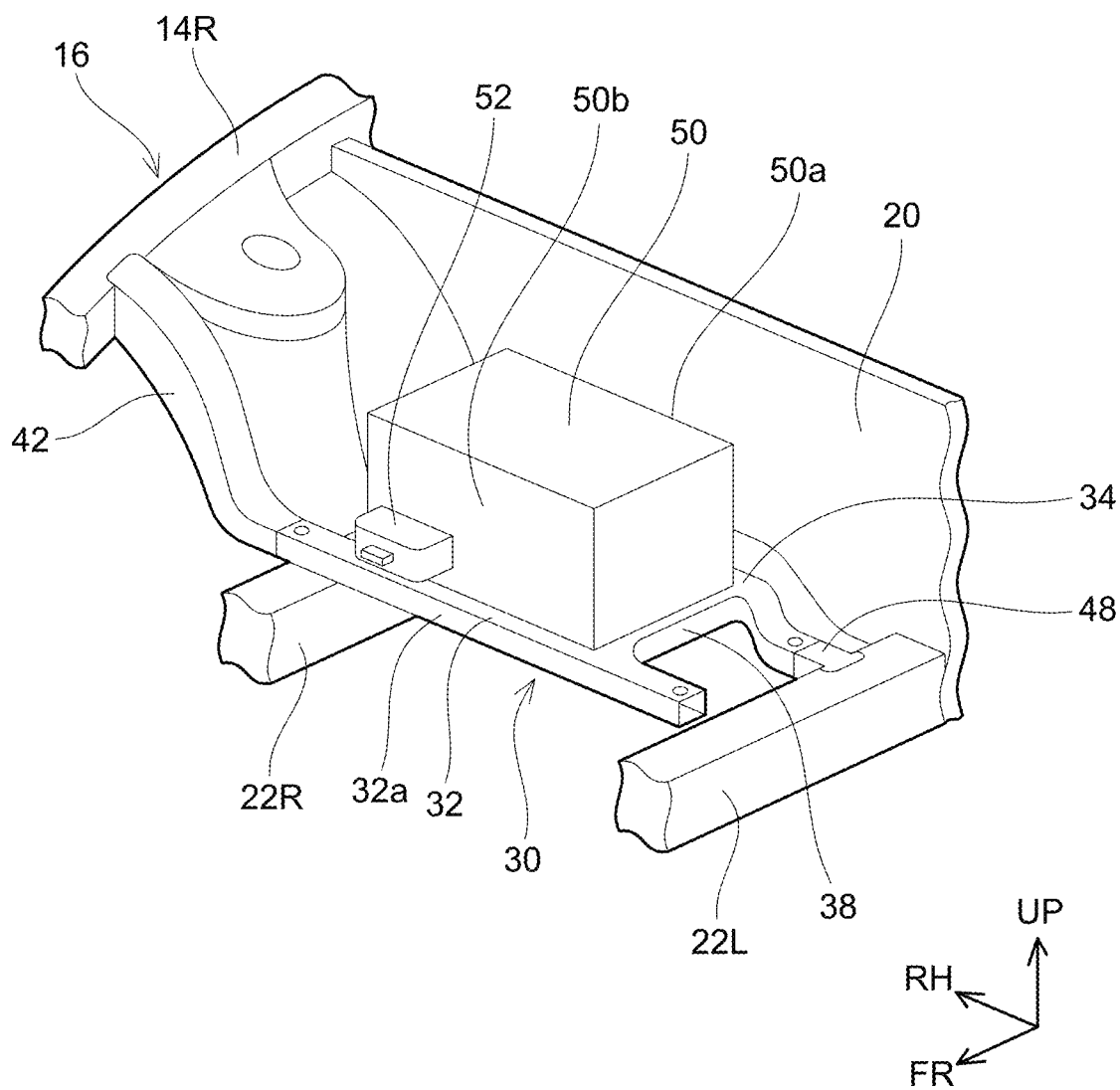
FIG. 5 illustrates a perspective view of the compartment (including the circuit case).

FIGS. 4 and 5 illustrate a circuit case 50 fixed on the component frame 30. The circuit case 50 houses a control circuit therein. The control circuit within the circuit case 50 is configured to control a traction motor not shown. For example, an inverter circuit configured to supply alternate current power to the traction motor is housed within the circuit case 50. The circuit case 50 is constituted of metal. In a top view as shown in FIG. 4, a rear side surface 50a of the circuit case 50 is on the front side of the rear side surface 34a of the rear crossmember 34 (entirety of the rear side surface 34a including the recess 34b). That is, the circuit case 50 does not protrude rearward from the rear side surface 34a of the rear crossmember 34 in the top view. Further, in the top view as shown in FIG. 4, a front side surface 50b of the circuit case 50 is on the rear side of a front side surface 32a of the front crossmember 32. That is, the circuit case 50 does not protrude frontward from the front side surface 32a of the front crossmember 32 in the top view.

A cover 52 with a terminal block is arranged on the front side surface 50b of the circuit case 50. An entirety of the cover 52 with the terminal block excluding a wiring is constituted of resin. The cover 52 protrudes frontward from the front side surface 50b of the circuit case 50. In the top view as shown in FIG. 4, the cover 52 protrudes from the front side surface 32a of the front crossmember 32.

Figure 6:
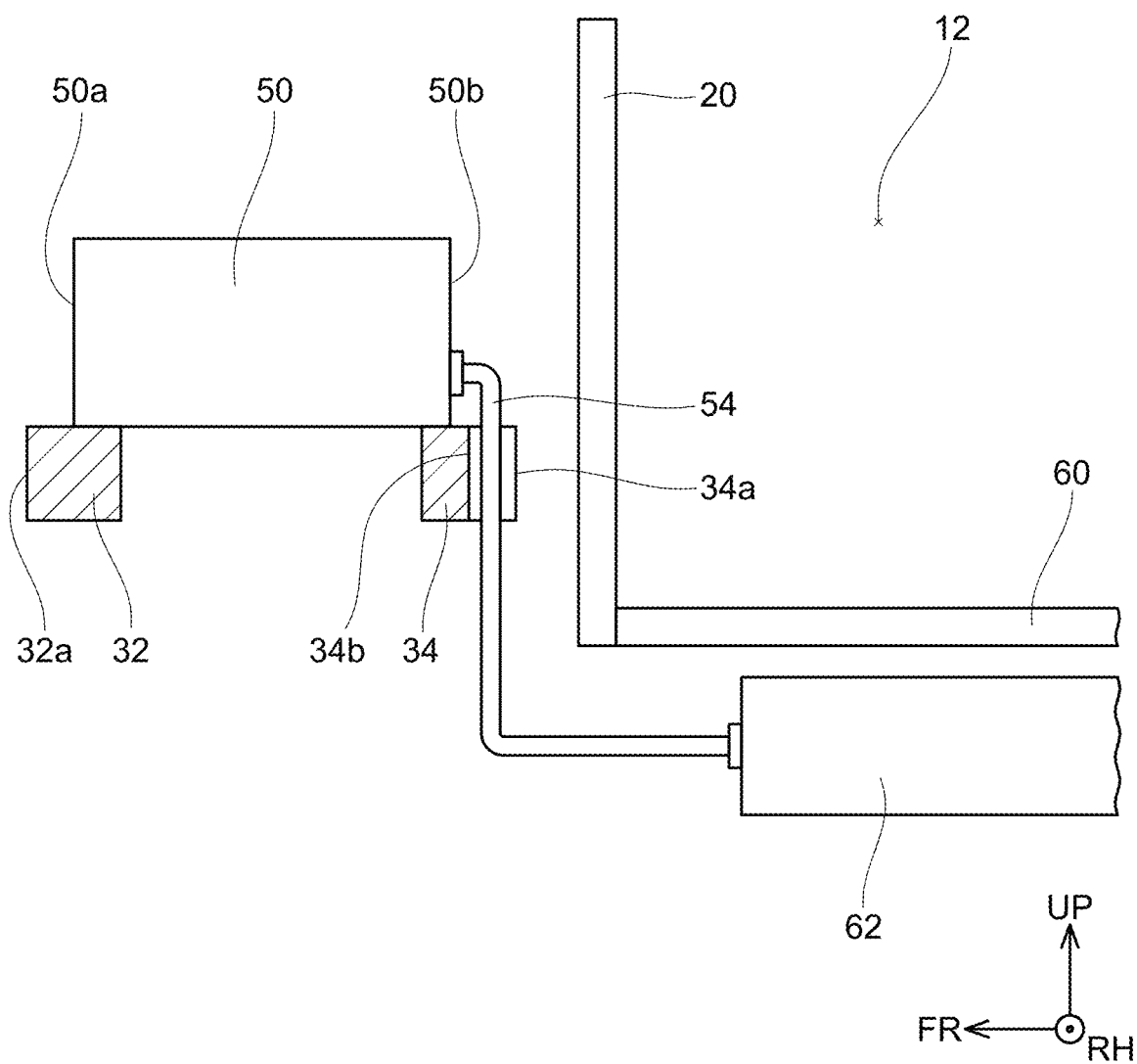
FIG. 6 illustrates a side view indicating a passage of a wiring 54.

A wiring 54 is arranged on the rear side of the circuit case 50. The wiring 54 runs from the rear side surface 50a of the circuit case 50 to the inside of the circuit case 50, and is connected to the control circuit within the circuit case 50. As shown in FIG. 6, the wiring 54 extends from the circuit case 50 and downward at the rear side of the rear crossmember 34. The wiring 54 extends downward through the recess 34b of the rear crossmember 34. The wiring 54 bends at a position lower than the rear crossmember 34 and extends rearward, and is connected to a main battery 62 arranged below a floor panel 60 (plate constituting a floor surface of the cabin 12). A direct current power is supplied from the main battery 62 to the control circuit within the circuit case 50 via the wiring 54.

The body 10 is deformed when the vehicle collides at its front. The deformation of the body 10 causes the circuit case 50 to be pushed rearward (to a dash panel 20 side) along with the component frame 30. Due to this, the circuit case 50 and the component frame 30 make contact with rear body constituent member(s) (member(s) of the body constituting the rear part of the compartment 16 (such as the dash panel 20)). At this occasion, since the circuit case 50 is arranged on the front side of the rear side surface 34a of the rear crossmember 34, the rear crossmember 34 is likely to collide with the rear body constituent member(s) before the circuit case 50 collides with the rear body constituent member(s). Due to this, load applied on the circuit case 50 is likely to be reduced, and the circuit case 50 is unlikely to be damaged. Further, the wiring 54 is disposed in the recess 34b, thus when the rear crossmember 34 collides with the rear body constituent member(s) (such as the dash panel 20), the wiring 54 is less likely to be held between the rear crossmember 34 and the rear body constituent member(s). Such a configuration suppresses the wiring 54 from being damaged.

Further, when the vehicle collides at its front, front body constituent member(s) (member(s) of the body constituting a front part of the compartment 16 (such as the core support 18)) are pushed rearward (to a circuit case 50 side). Due to this, the front body constituent member(s) make contact with the circuit case 50 and the component frame 30. At this occasion, since the circuit case 50 is disposed on the rear side of the front side surface 32a of the front crossmember 32, the front body constituent member(s) are likely to collide with the front crossmember 32 before the front body constituent member(s) collide with the circuit case 50. Due to this, the load applied on the circuit case 50 is likely to be reduced, and the circuit case 50 is less likely to be damaged. Further, the cover 52 protrudes more frontward than the front side surface 32a of the front crossmember 32, the front body constituent member(s) are likely to collide with the cover 52. When the front body constituent member(s) collide with the cover 52, the cover 52 is pressurized against the circuit case 50. However, the cover 52 which is made of resin is weaker in strength than the circuit case 50 which is made of metal. Accordingly, even when the cover 52 is pressurized against the circuit case 50, the circuit case 50 is unlikely to be damaged. As such, even when the cover 52 made of resin protrudes frontward than the front side surface 32a of the front crossmember 32, the circuit case 50 can be suppressed from being damaged.

As aforementioned, according to the electric vehicle in the embodiment, it is possible to reduce damage to the circuit case 50 upon collision. Due to this, it is possible to reduce damage to the control circuit within the circuit case 50.

The component frame 30 has the two crossmembers 32 and 34 in the aforementioned embodiment, but alternatively, the component frame may comprise three or more crossmembers. Further, the component frame 30 has the two connecting members 36 and 38 in the aforementioned embodiment, but alternatively, the component frame may comprise one connecting member or three or more connecting members.

Some of the technical elements disclosed herein will be listed below. It should be noted that the respective technical elements are independent of one another, and are useful solely or in combinations.

In an aspect of the body disclosed herein, the plurality of crossmembers may comprise a front crossmember which is a frontmost crossmember of the plurality of crossmembers, and the circuit case may be located on a rear side of a front end of the front crossmember in the top view.

When the electric vehicle collides at its front, the body constituent member(s) constituting the front part of the electric vehicle are pressed toward the circuit case. If the body constituent member(s) collide with the circuit case, the control circuit within the circuit case is likely to be damaged. In the above configuration, the circuit case is disposed on the rear side of the front edge of the front crossmember. Due to this, when the body constituent member(s) constituting the front of the electric vehicle are pressed toward the circuit case, the body constituent member(s) are likely to collide with the front crossmember before colliding with the circuit case. Due to this, the load applied on the circuit case is likely to be reduced. As such, it is possible to reduce the damage to the control circuit within the circuit case.

An aspect of the body disclosed herein may further comprising a battery; and a wiring electrically connecting the battery and the control circuit. A recess may be provided on a rear side surface of the rear cross member. The wiring may extend downward from a rear side surface of the circuit case and through the recess.

According to the above configuration, the wiring is less likely to be damaged when the circuit case and the component frame are pushed rearward by a collision of the electric vehicle.

While specific examples of the present disclosure have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

What is claimed is:

1. An electric vehicle, comprising:
   a body comprising a compartment on a front side of a cabin;
   a component frame located in the compartment, and connected to the body; and
   a circuit case located on the component frame, comprising therein a control circuit configured to control a traction motor, and constituted of metal;
   a battery; and
   a wiring electrically connecting the battery and the control circuit,
   wherein
   the component frame comprises:
     a plurality of crossmembers extending along a vehicle left-right direction; and
     a connection member connecting the plurality of crossmembers to each other,
   the plurality of crossmembers comprises a rear crossmember which is a rearmost crossmember of the plurality of crossmembers,
   the circuit case is on the front side of a rear end of the rear crossmember in a top view,
   a recess on a rear side of the rear crossmember, and
   the wiring extending downward from a rear side surface of the circuit case and through the recess.

2. The electric vehicle of claim 1, wherein
   the plurality of crossmembers comprises a front crossmember which is a frontmost crossmember of the plurality of crossmembers, and
   the circuit case is located on a rear side of a front end of the front crossmember in the top view.

* * * * *